United States Patent [19]
King

[11] 4,318,082
[45] Mar. 2, 1982

[54] METHOD AND APPARATUS FOR ELECTRONICALLY ALIGNING ACTIVE ELEMENTS OF AN IMAGING ARRAY WITH AN OPTICAL SYSTEM

[75] Inventor: John T. King, Waterloo, Canada

[73] Assignee: NCR Canada Ltd - NCR Canada Ltee, Mississauga, Canada

[21] Appl. No.: 108,875

[22] Filed: Dec. 31, 1979

[51] Int. Cl.$^3$ .............................................. G06K 9/32
[52] U.S. Cl. ............................ 340/146.3 H; 250/204; 356/400; 340/146.3 F
[58] Field of Search ............. 340/146.3 H, 146.3 MA, 340/146.3 F, 146.3 R; 250/204, 557, 566, 208; 356/400; 358/212

[56] References Cited

U.S. PATENT DOCUMENTS

| | | | |
|---|---|---|---|
| 3,104,369 | 9/1963 | Rabinow et al. | 340/146.3 MA |
| 3,417,372 | 12/1968 | Bieser | 340/146.3 MA |
| 3,432,673 | 3/1969 | Mader | 340/146.3 H |
| 3,551,887 | 12/1970 | Vaccaro et al. | 340/146.3 H |
| 3,559,169 | 1/1971 | Gillmann et al. | 340/146.3 H |
| 3,675,024 | 7/1972 | Benard | 250/208 |
| 3,727,184 | 4/1973 | Roza et al. | 340/146.3 H |
| 4,132,888 | 1/1979 | Kondo | 250/204 |
| 4,147,928 | 4/1979 | Crean et al. | 340/146.3 F |
| 4,219,719 | 8/1980 | Frosien et al. | 250/557 |
| 4,265,542 | 5/1981 | Snow | 356/400 |

*Primary Examiner*—Leo H. Boudreau
*Attorney, Agent, or Firm*—J. T. Cavender; Albert L. Sessler, Jr.; Elmer Wargo

[57] ABSTRACT

An imaging apparatus comprising an array having a central axis and a predetermined number of light responsive elements positioned in the array, with each light responsive element producing an output in response to light impinging thereon and an optical system including a lens for directing light from an image of a predetermined size onto a first number of said light responsive elements which said first number is less than said predetermined number. The apparatus also includes a selection unit for selecting a said first number of said light responsive elements which are positioned with regard to said central axis, means for receiving the outputs of said selected first number of light responsive members and also for producing a stream of data therefrom; and a switch unit for adjustably selecting the particular said first number of light responsive elements upon which light from said image impinges.

The method of this invention comprises selecting a step size by which the first number of light responsive members selected may be shifted, mechanically aligning the optical system to enable the incident light from an image to fall along an initial position in the array, and selecting the particular light responsive elements which actually receive the incident light by sequentially stepping a contiguous group of the first number of the light responsive elements from the initial position until the particular light responsive members selected correspond to those actually receiving the incident light.

9 Claims, 16 Drawing Figures

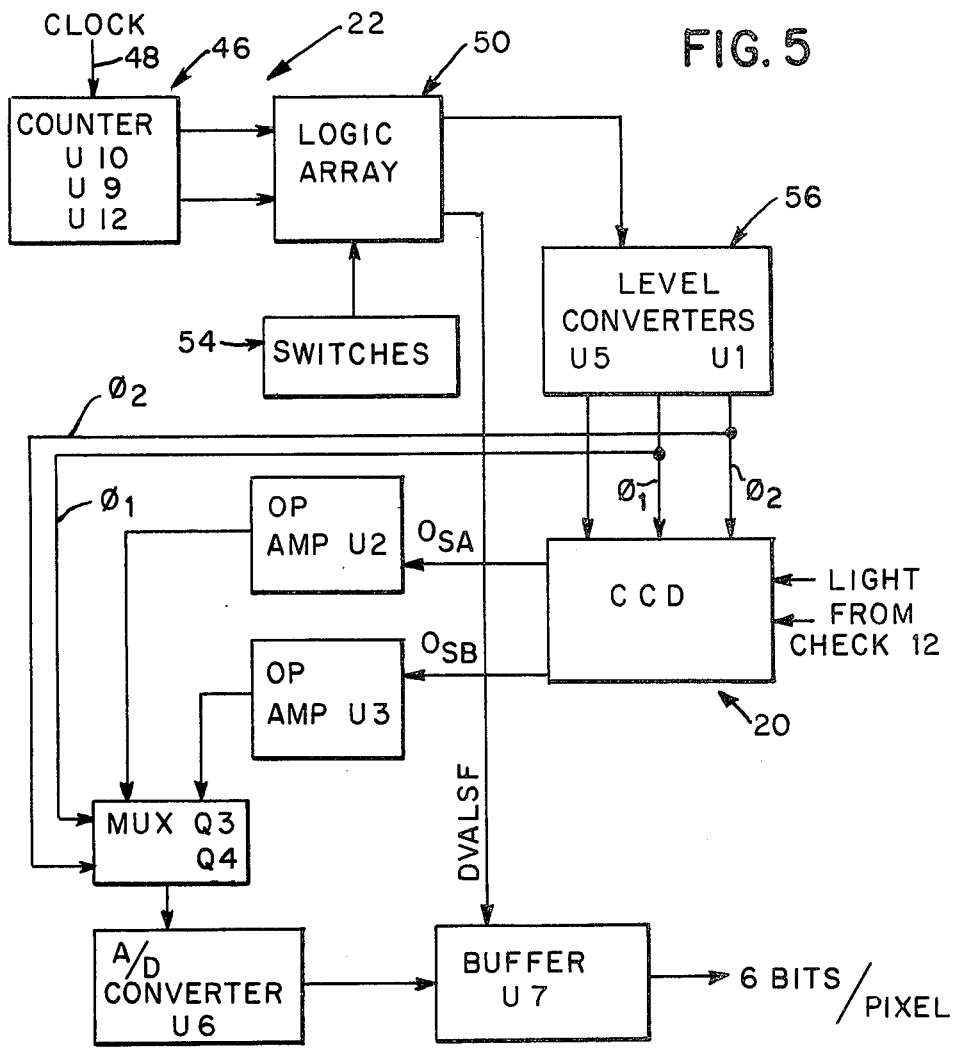

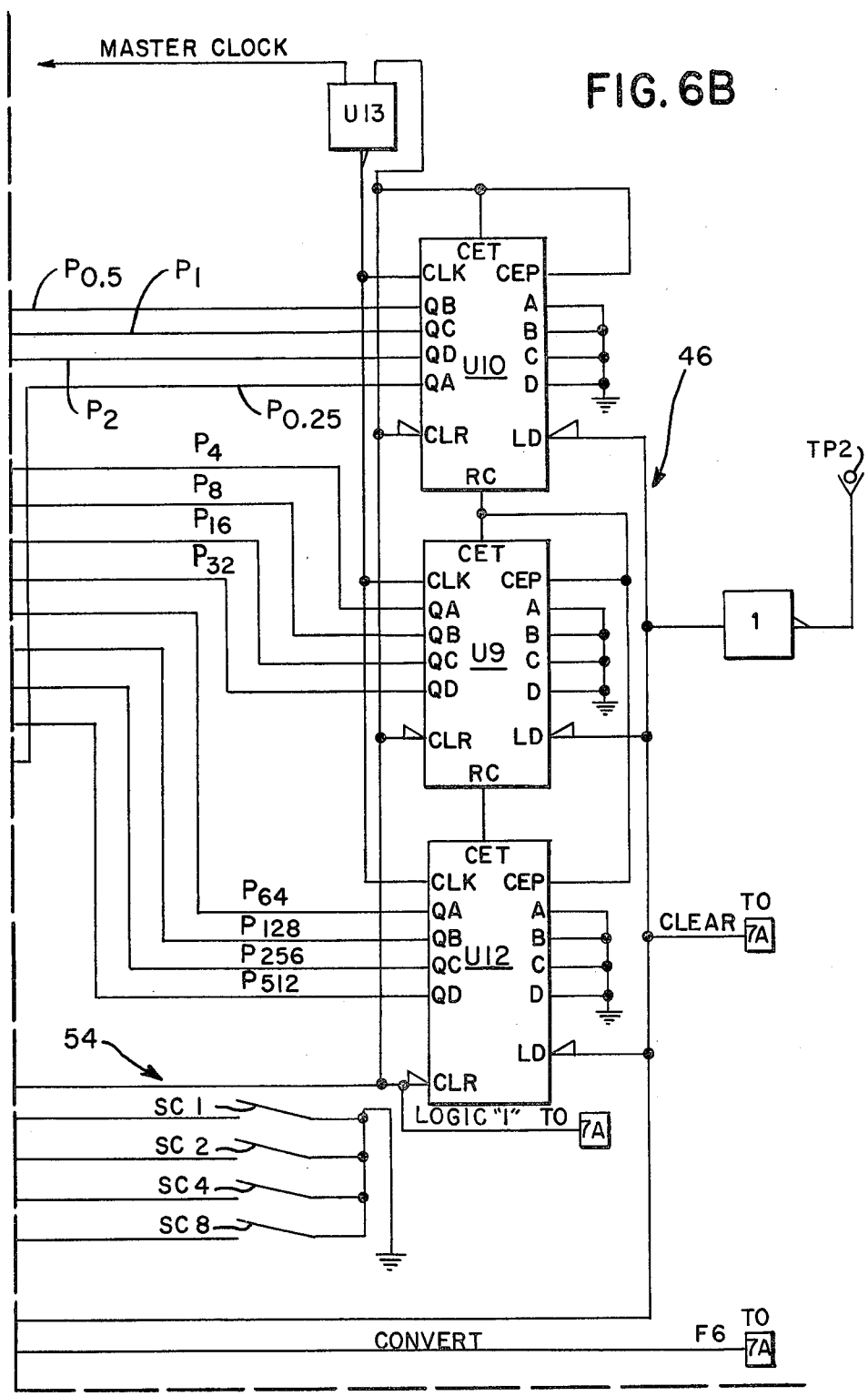

FIG.7A
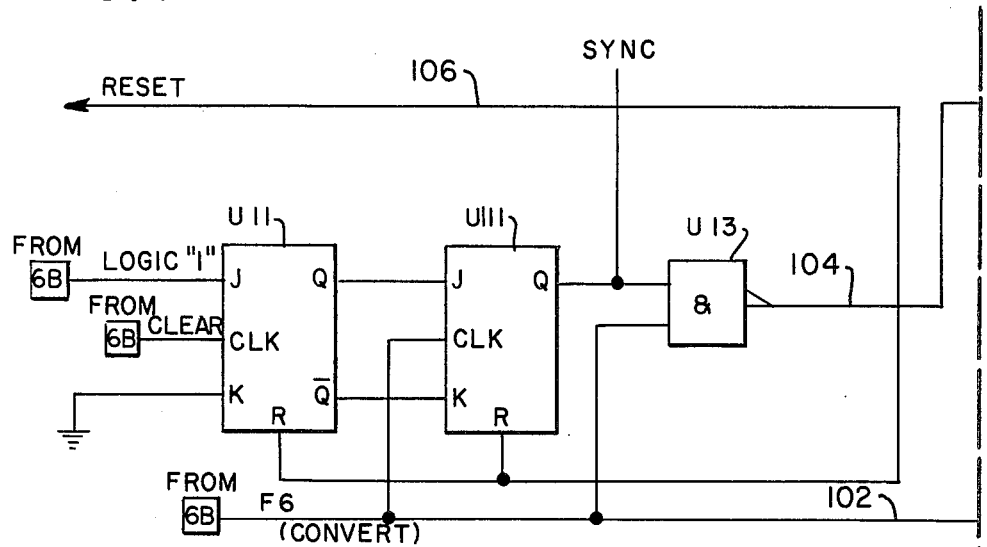
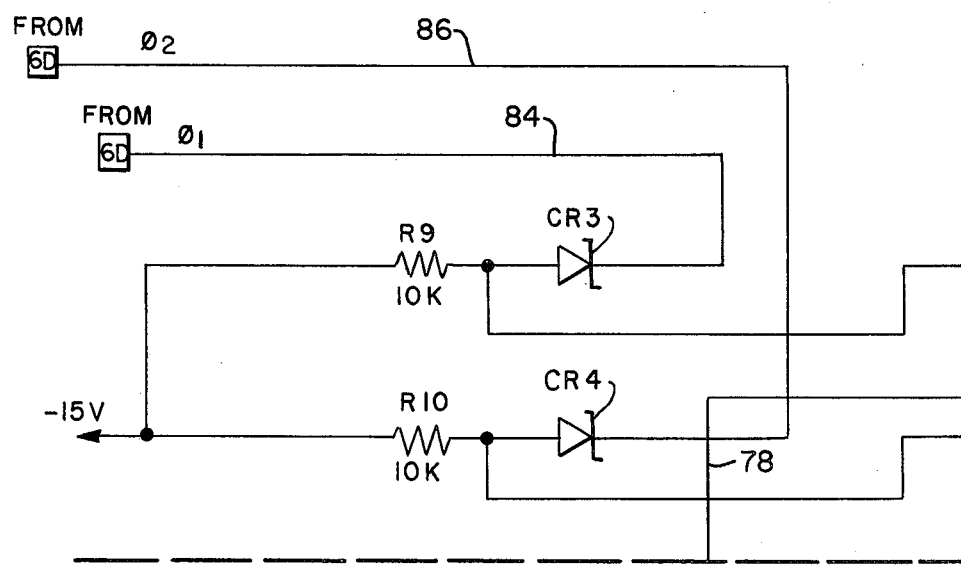

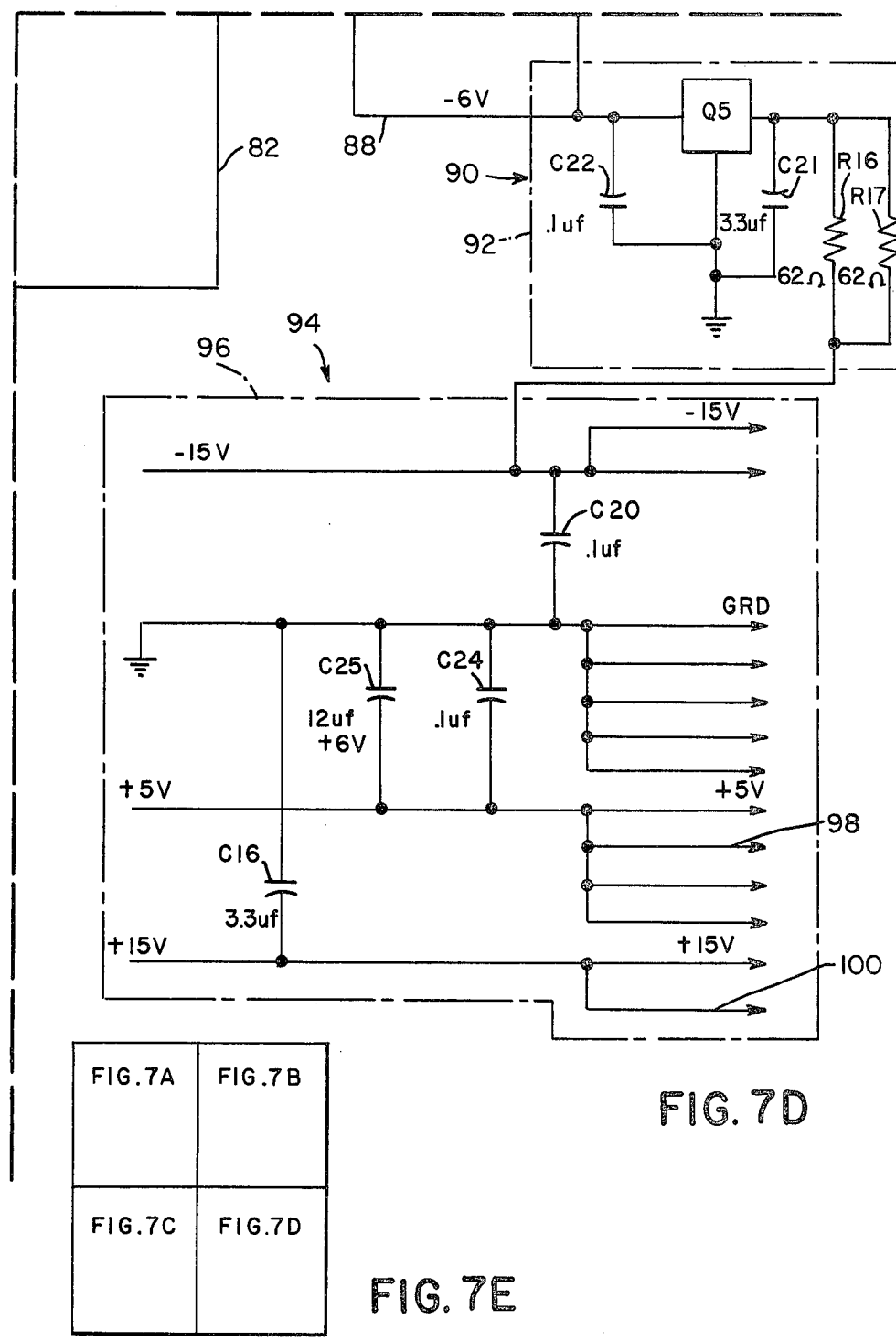

METHOD AND APPARATUS FOR ELECTRONICALLY ALIGNING ACTIVE ELEMENTS OF AN IMAGING ARRAY WITH AN OPTICAL SYSTEM

BACKGROUND OF THE INVENTION

This invention relates to an imaging method and apparatus and more particularly, it relates to a method and apparatus for electronically aligning active elements of an imaging array with an optical system.

In one method of banking, it is necessary to digitize the images of documents such as checks and/or deposit slips, for example, to enable digitized images of the documents to be processed for banking purposes without the use of the actual checks or deposit slips themselves. Naturally, reducing the amount of data to be included in the digitized images facilitates the generation, transmission, and storing of such digitized images and also reduces the processing time when handling such digitized images for banking or transmission purposes.

One method of generating a digitized image is to determine the outer parameters of an object whose image is to be digitized and to cause the incident light from the object including the outer parameters thereof to be focused upon an entire array of light responsive elements. One of the problems with this method is that all the elements of the array are used, and consequently, a large amount of digitized data is generated which increases the transmission and processing times, for example.

When the incident light from an entire object whose image is to be digitized falls upon less than all of the light responsive elements in an associated imaging array, it is difficult, if not impossible, to mechanically align a lens in an optical system which directs the incident light to the array so that the particular light responsive elements in the array which are selected to produce the digitized image do in fact receive the incident light from the associated object.

SUMMARY OF THE INVENTION

The apparatus of this invention comprises an array having a central axis and a predetermined number of light responsive elements positioned in said array, with each said light responsive element producing an output in response to light impinging thereon; an optical system including a lens for directing light from an image of a predetermined size on to a first number of said light responsive elements which said first number is less than said predetermined number; first means for selecting a said first number of said light responsive elements which are positioned with regard to said central axis; means for receiving said outputs of said selected first number of light responsive members and also for producing a stream of data therefrom; and second means for adjustably selecting the particular said first number of light responsive elements upon which light from said image impinges.

In an imaging apparatus of the type described in the preceding paragraph, having an array of n plus m light-responsive elements wherein n is the number of said light-responsive elements which will be aligned to receive incident light from an image of a predetermined size, and m is the number of light-responsive element in said array upon which no incident light is expected to fall, the method of selecting the particular ones of said light-responsive elements which actually receive said incident light according to this invention, comprises the steps of:

(a) selecting a step size s, wherein s is less than said m, and wherein said n may be selected from a plurality of different locations which plurality is equal to m divided by s locations;

(b) mechanically aligning an optical system to enable the incident light from said image to fall along an initial position in said array; and (c) selecting the particular n light-responsive elements which actually receive said incident light by sequentially stepping a contiguous group of n light-responsive elements in said step sizes s from said initial position along said array until the particular n light-responsive elements selected correspond to those actually receiving said incident light from said image.

BRIEF DESCRIPTION OF THE DRAWING

FIG. 5 is a general schematic diagram, in block form showing additional details of the scanner module shown in FIG. 1;

FIGS. 6A, 6B, 6C, and 6D show a portion of the scanner module shown in FIGS. 1 and 5;

FIGS. 7A, 7B, 7C, and 7D taken together show additional details of a portion of the scanner module shown in FIG. 1;

FIG. 7E shows how the FIGS. 7A-7D are to be arranged to form a composite drawing.

DETAILED DESCRIPTION OF THE INVENTION

Figure 1:
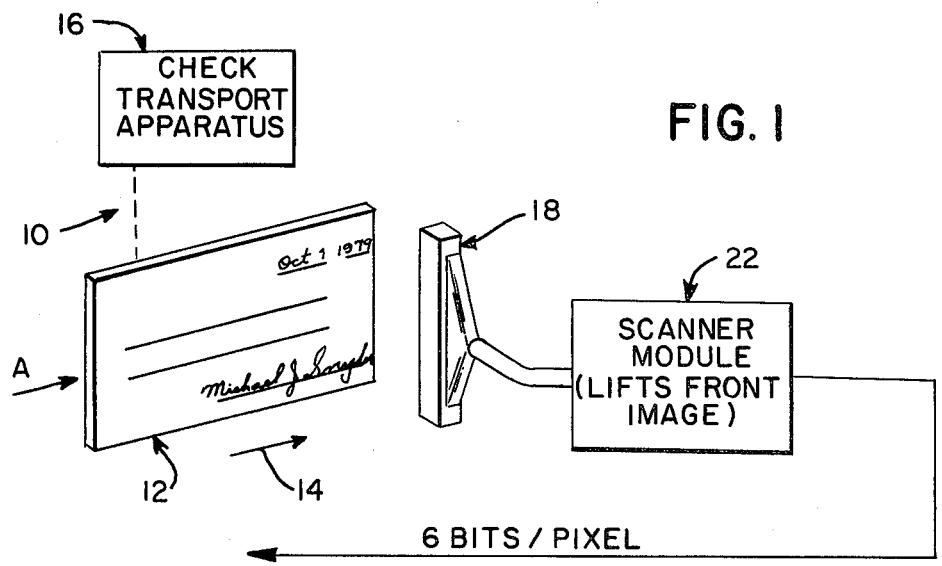
FIG. 1 is a general schematic diagram showing an imaging or scanning environment in which the method and apparatus of this invention may be used.
Figure 3:
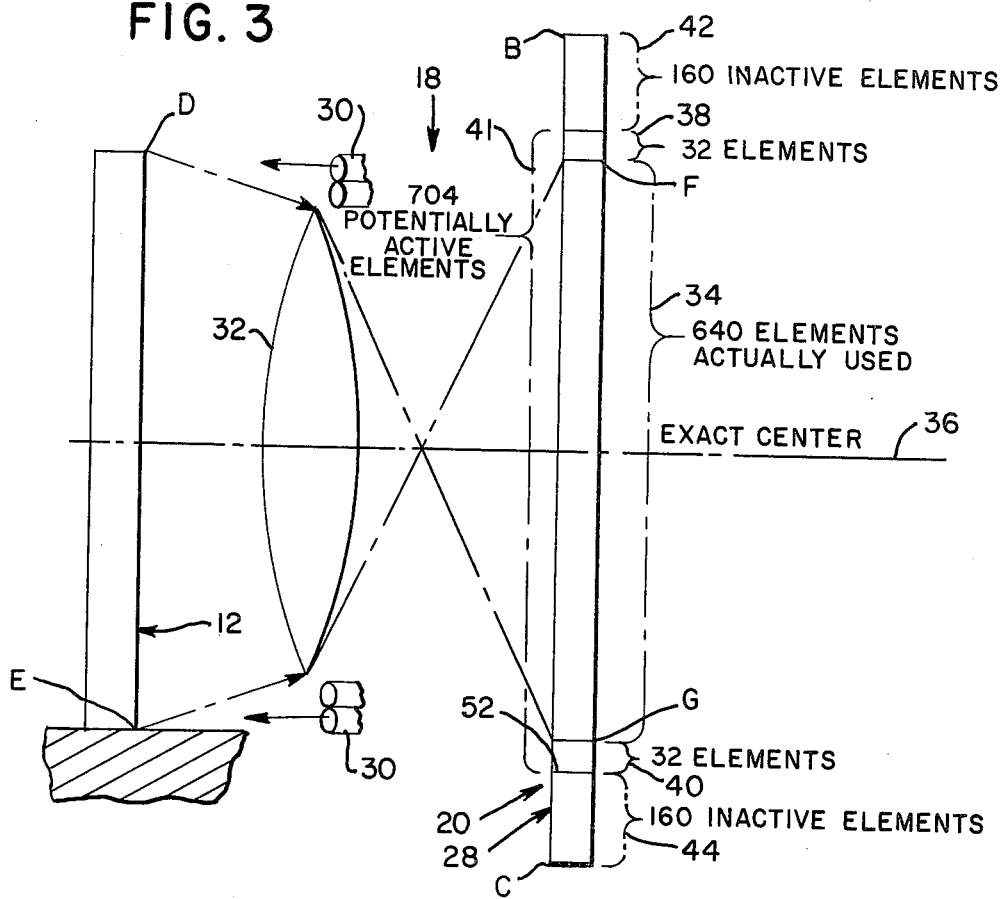
FIG. 3 is a diagrammatic showing of an imaging device used in the imaging apparatus shown in FIG. 1 as viewed from the direction of arrow A in FIG. 1.

FIG. 1 is a general diagram of an imaging system 10 in which the apparatus and method of this invention may be used. In the imaging system 10, a document such as a check 12 is moved along the direction of arrow 14 (by a conventional check transport apparatus 16) past an imaging apparatus designated generally as 18. The imaging apparatus 18 includes a conventional imaging device 20, a portion of which is seen in FIG. 3. The imaging apparatus 18 is operatively coupled to a scanner module 22. The imaging device 20 utilized in this invention is a charge coupled device (CCD) or imaging array such as the Fairchild Charge Coupled Device CCD131 which is manufactured by Fairchild Corporation.

The general function of the imaging apparatus 18 (FIG. 1) and the scanner module 22 is to "scan" the check 12 and produce a digitized image thereof, with the output of the scanner module 22 being a serial stream of data which represents a gray scale resolution of the image of the check 12.

Figure 2:
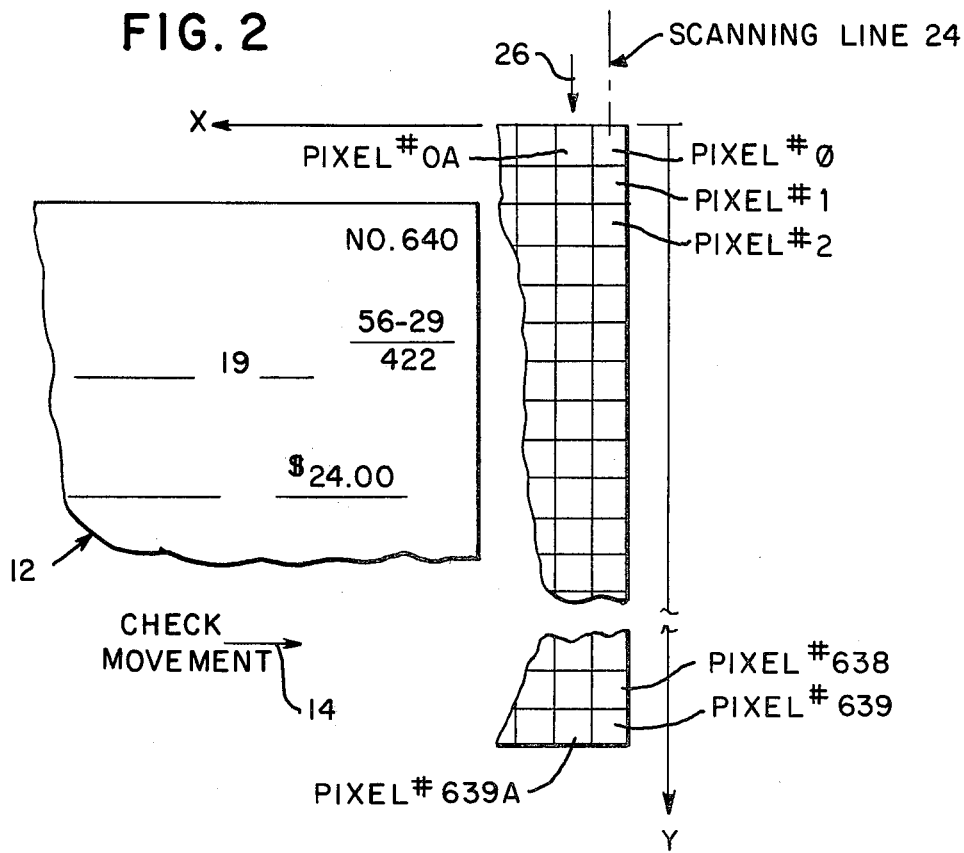
FIG. 2 is an enlarged view of the picture elements or "pixels" being produced as a check is moved past a scanning line associated with the imaging apparatus shown in FIG. 1.

FIG. 2 is an enlarged view of the check 12 as it is moved past a scanning line 24 associated with the imaging apparatus 18. In the system 10 being described, the imaging apparatus 18 produces a plurality of picture elements or "pixels", with each pixel having a particular gray scale value representing a portion of the check being scanned. For example, there are 640 pixels ranging from pixel #$\phi$ through pixel #639 obtained from a scan at the scanning line 24, although the number of pixels can be changed to suit particular applications. As the check 12 is moved along in the direction of arrow 14, a second scan (at the scanning line 24 but represented by line 26) will be generated having pixels #$\phi$A through #639A therein; the resulting pixels produced may be considered as having the X and Y coordinates shown. In the embodiment described, each pixel has a gray scale value which is six binary bits long. Each pixel can have one of 64 gray scale values ranging from completely black to completely white; with completely black being a binary $\phi$ and completely white being a binary 1. Consequently, the data output from the scanner module 22 (FIG. 1) will be, for example, a six bit gray scale value for pixel #$\phi$, followed by a six bit gray scale value for pixel #1, etc. By keeping an accurate count of the pixels #$\phi$ through #639 from the first scan, followed by pixels #$\phi$A through pixels #639A from the second scan, for example, the digitized image of the check 12 can be conventionally reconstructed along the X and Y coordinates shown.

Figure 4:
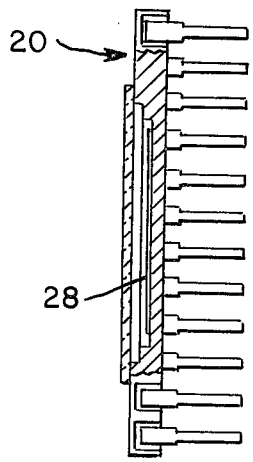
FIG. 4 is an enlarged side view of the outside of the imaging device used in this invention, with the position of the device shown in FIG. 4 corresponding to the position of the portion of the imaging device shown in FIG. 3.

FIG. 3 shows additional details of the imaging device 20 as viewed from the direction of arrow A in FIG. 1. From the direction of arrow A, the check 12 is considered as moving into the plane of the drawing of FIG. 3; however, the sizes of the elements shown in FIG. 3 are greatly distorted to facilitate a description thereof. For example, the height of the check 12 may be about 4 inches and the total height of the array of the active elements 28 included in the imaging device 20 as measured between points B and C in FIG. 3 is about 0.5 inch. With this disparity in size, it can be appreciated that it is extremely difficult to mechanically align the imaging apparatus 18 with regard to the check 12 and the light-responsive elements 28 included in the imaging device 20 which will hereinafter be referred to as the charge coupled device (CCD) 20. FIG. 4 is an enlarged side view of the outside of the CCD 20 showing how the array of light responsive elements 28 is oriented within the CCD 20, the orientations of FIGS. 3 and 4 being the same.

With regard to FIG. 3, the imaging apparatus 18 (FIG. 1) also includes a source of illumination such as the light pipes 30 which direct light at the scanning line 24 (FIG. 2) so as to reflect light from the check 12 through a conventional imaging system including a lens 32 back to the light responsive elements 28 in the CCD 20. The particular CCD 20 selected for use in the system 10 has active elements numbered #$\phi$ through #1025 included therein; however, the elements numbered 0 and 1025 are not used; this leaves a total of 1024 light responsive elements 28 (FIG. 3) available for use. The system 10 was designed for utilizing 640 pixels (pixels #$\phi$ through #639) as seen in FIG. 2; however, other numbers of pixels could be used for particular applications.

Continuing with the embodiment being described, because there are 640 pixels (FIG. 2) required in the system 10, and there are 1024 light responsive elements 28 (FIG. 3) available in the CCD 20, a choice must be made as to which 640 elements out of the 1024 light responsive elements 128 available are to be selected for use in the system 10. As earlier stated herein, a problem exists in trying to align the check transport apparatus 16 (FIG. 1) and the imaging apparatus 18 so that the operating parameters of the data to be imaged (i.e. the total check 12) fall upon those 640 light responsive elements 28 which have been selected to receive the data, otherwise data will be lost. Basically, the problem manifests itself in trying to adjust the lens 32 relative to the light responsive elements 28 (FIG. 3) so that the outer parameters of the data to be digitized (as represented by points D and E on check 12 which may include some border area not shown) will be included in the range of the light responsive elements 28 selected for use in the system 10. In the embodiment described, the adjustment of the lens 32 relative to the light responsive elements 28 is effected by holding the lens 32 stationary and moving the array of elements 28 relative to it. For example, if the lens 32 were capable of being adjusted exactly, then the outer parameters (D&E) of the data to be digitized would fall within the 640 light responsive elements 28 included between the letters F and G in FIG. 3; in other words, the 640 elements in bracket 34 in FIG. 3 (between the letters F and G) would be the elements 28 which are actually used for obtaining the gray scale values associated with the check 12. However, such accurate mechanical alignment of the lens 32 relative to the 640 elements 28 selected cannot be achieved; consequently, it was necessary to provide an electronic apparatus and method for aligning the lens 32 with the light responsive elements 28 as earlier discussed herein.

In this regard, after the lens 32 (FIG. 3) is mechanically aligned as best as is possible along the exact center 36 of the light responsive elements 28, (by moving the elements 28 relative to a stationary lens 32) it is necessary to provide (for adjustment purposes) additional amounts of elements 28 which potentially may be used for the 640 elements 28 selected to produce the digitized image. In the embodiment described, 32 of the elements 28 included in bracket 38 are provided above the elements 28 included in bracket 34, and 32 elements 28 are included in the bracket 40 below the bracket 34; this means that there is a total 704 (640+32+32) potentially active light responsive elements 28 (as shown by bracket 41) which may be selected depending upon how the lens 32 is mechanically adjusted with respect to an initial position such as the center 36 (FIG. 3). Because there is a total of 1024 light responsive elements 28 available in the device 20, there will be 160 inactive elements 28 (in bracket 42) above bracket 38 and there will also be 160 inactive elements (in bracket 44) below bracket 40. Naturally, the numbers of elements 28 selected as active or inactive herein are used merely for purposes of illustration; accordingly, the numbers may be changed to suit particular applications. The scanner module 22 (FIG. 1) has means therein to provide for the selection of the 640 light responsive elements 28 to be used for generating the pixels #$\phi$ through #639 shown in FIG. 2.

The scanner module 22 (FIG. 1) is shown in more detail in the block form shown in FIG. 5. The scanner module 22 includes a counter means 46 which is incremented by a master clock 48 to count from $\phi$ through 1024 in the embodiment described; the counter means 46 provides a count which relates to the pixel count from #ϕ through #639 mentioned earlier herein.

Continuing with a general description of FIG. 5, the output of the counter means 46 is fed into a field programmable logic array (FPLA) 50, such as IC#82S100 which is manufactured by Signetics, Inc. The FPLA 50 contains logic equations (to be later described herein) which, in effect, keep tabs on or control of two different binary counts. The first count relates to the absolute number (1024) of light responsive elements 28 existing in the CCD 20 (FIG. 3) and the second count relates to the particular 640 light responsive elements 28 selected to be the active elements used. The logic equations in FPLA 50 are utilized to start outputting data at a given point. For example, the 160 inactive elements 28 included in bracket 44 in FIG. 3 may be numbered as the absolute #1 through #160 (out of the total of 1024 elements), and if the next first element 28 (marked as 52 in FIG. 3) included in the bracket 40 were to be the first element selected as one of the 640 elements 28 for use in obtaining the pixels mentioned, then element 52 would have an absolute "first count" of #161 associated therewith and a "second count" of #ϕ which corresponds to pixel #ϕ of the 640 pixels desired in the embodiment described. The particular first element 52 at which the FPLA 50 begins outputting data or counting is determined by the logic equations included therein and the settings on an associated group of switches 54 to be described in detail hereinafter. The group of switches 54 enables the FPLA 50 to increase the starting point of the first active element 52 (FIG. 3) by certain increments (to be later described herein) so as to enable the 640 elements 28 selected for producing the 640 pixels mentioned to be aligned with lens 32 so as to obtain all the digitized data within the operating parameters represented by points D and E in FIG. 3.

The output of the FPLA 50 (FIG. 5) is fed through level converters 56 to the CCD 20. The function of the level converters 56 is to adjust the operating voltage levels between the FPLA 50 and the CCD 20, as they utilize different technologies and require different operating voltages. The output of the level converters 56 is fed into the CCD 20, and this output also includes $\phi_1$ and $\phi_2$ signals which are used in shifting data out of the CCD 20. Basically, all the light responsive elements 28 in the CCD 20 produce their signals at the same time, but they are transferred out serially by the $\phi_1$ and $\phi_2$ signals, with the $\phi_1$ signal being used to transfer out the signals associated with the even elements 28 and the $\phi_2$ signal being used to transfer out the signals associated with the odd elements.

From the CCD 20 (FIG. 5), the output signals from the odd elements 28 pass out over the $O_{SA}$ line to an operational amplifier (op amp) U2, and the output signals from the even elements 28 pass out over the $O_{SB}$ line to op amp U3. The outputs from the op amps U2 and U3, which are of the non-inverting variety, are multiplexed via a multiplexer Q3, Q4 to an analog to digital (A/D) converter U6 which produces a 6 bit output (to handle the 64 scales of gray in the embodiment being described). The $\phi_1$ and $\phi_2$ signals are used as the select signals for the multiplexer Q3, Q4 to select the even and odd outputs from the CCD 20, and the outputs from the converter pass through a buffer U7. A data valid signal (DVALSF) is used to transfer the output from the buffer U7 to a utilization device not shown. The data stream coming out of the buffer U7 is comprised of six bits of data followed by another six bits of data from the next light responsive element 28. For example, in the example being described, if the first light responsive element 52 in FIG. 3 (which had an absolute first count of #161) is to be the first of the 640 elements 28 selected to be active, then it would provide data for the pixel #ϕ in FIG. 2, and the next six bits of data from the buffer U7 (FIG. 5) would be for pixel #1, etc., until pixel #639 were reached. Thereafter, data for pixel #ϕA, etc., would be received for the second scan represented by line 26 in FIG. 2.

The scanner module 22 shown in FIG. 5 is shown in more detail in FIGS. 6A, 6B, 6C, 6D, 7A, 7B, 7C, and 7D.

The counter means 46 shown in FIG. 5 is comprised of conventional counters U10, U9, and U12 which are conventionally cascaded together as shown in FIG. 6B to produce a single counter which counts from a binary count of zero to a binary count of 1024. The counters U10, U9, and U12 are of type 74LS161 which is manufactured by Texas Instruments, for example. A master clock having a frequency of 5 MHz., in the embodiment being described, passes through a NAND gate U13 to the clock input of each of the counters U10, U9, and U12. These counters provide the pixel count, (#ϕ through #639), used by the logic array 50. The values such as $P_{0.25}$ associated with the QA output of counter U10 and the value such as $P_{512}$ associated with the QD output of counter U12 represent the binary weights applied to these counters. The combined twelve outputs from the counters U10, U9, and U12 are fed into the $I_\phi$ through $I_{10}$ and the $I_{15}$ inputs to the logic array 50, where these outputs are used by logic equations in the logic array 50 to generate control signals to the CCD 20 (FIGS. 3 and 4) for imaging. The control signals from the logic array 50 leave over the $F_\phi$ through $F_7$ outputs thereof to the CCD 20.

The logic equations associated with the logic array 50 (FIG. 6A) are as follows:

| | |
|---|---|
| Load Zero/ | = $P_{512} P_{256} P_{128} P_{64} \overline{P_{32}} P_{16} \overline{P_8} P_4 \overline{P_2} P_1$ $P_{0.5} P_{0.25} = P(981.75)$ |
| Conv | = $(\overline{P_{512}} + P_{512} \overline{P_{256}} \overline{P_{128}}) P_{0.5} P_{0.25}$ |
| $\phi_{RA}$ | = $\overline{P_1} \overline{P_{0.5}}$ |
| $\phi_{RB}$ | = $P_1 \overline{P_{0.5}}$ |
| $\overline{\phi_2} = \phi_1$ | = $P_1 + \phi_{XA} + \phi_{XB}$ |
| $\phi_{XA}$* | = $P_{512} P_{256} \overline{P_{128}} \overline{P_{64}} \overline{P_{32}} P_{16} P_8 P_4 P_2 \overline{P_1}$ = $P(798)$ |
| $\phi_{XB}$* | = $P_{512} P_{256} \overline{P_{128}} \overline{P_{64}} P_{32} \overline{P_{16}} \overline{P_8} \overline{P_4} \overline{P_2} \overline{P_1}$ = $P(800)$ |

*The values shown for $\phi_{XA}$ and $\phi_{XB}$ are for all switches SC8, SC4, SC2, and SC1 (FIG. 6B) in the closed positions.

If the $\phi_{XA}$ and $\phi_{XB}$ decode a value other than P(798) and P(800), respectively, it means that the usual active light responsive elements 28 between the range of #161 and #800 are being used. As earlier stated herein, an adjustment to the particular light responsive elements 28 selected to produce the pixels can be made by the switches 54 shown in FIGS. 5 and 6B. The resulting equations for $\phi_{XA}$ and $\phi_{XB}$ become:

$\phi_{XA}$ = $\overline{S_8} \overline{S_4} \overline{S_2} \overline{S_1} P_{512} P_{256} \overline{P_{128}} \overline{P_{64}} \overline{P_{32}} P_{16} P_8 P_4 P_2 \overline{P_1}$ -continued

```
         i.e. S(0) P(798)
            + S(1) P(794)
            + S(2) P(790)
            + S(3) P(786)
            + S(4) P(782)
            + S(5) P(778)
            + S(6) P(774)
            + S(7) P(770)
            + S(8) P(766)
            + S(9) P(762)
            + S(10) P(758)
            + S(11) P(754)
            + S(12) P(750)
            + S(13) P(746)
            + S(14) P(742)
            + S(15) P(738)
```

$\phi_{XB} = \overline{S_8}\ \overline{S_4}\ \overline{S_2}\ \overline{S_1}\ P_{512}\ P_{256}\ \overline{P_{128}}\ \overline{P_{64}}\ \overline{P_{32}}\ \overline{P_{16}}\ \overline{P_8}\ \overline{P_4}\ \overline{P_2}\ \overline{P_1}$

```
         i.e. S(0) P(800)
            + S(1) P(796)
            + S(2) P(792)
            + S(3) P(788)
            + S(4) P(784)
            + S(5) P(780)
            + S(6) P(776)
            + S(7) P(772)
            + S(8) P(768)
            + S(9) P(764)
            + S(10) P(760)
            + S(11) P(756)
            + S(12) P(752)
            + S(13) P(748)
            + S(14) P(744)
            + S(15) P(740)
```

Note that in the above, when the switches 54 are set at zero, i.e. when S=0, then $\phi_{XA}$ will equal P(798). When the switches 54 are set at S=1, then $\phi_{XA}$ will equal P(794). A similar correlation exists for $\phi_{XB}$.

The switches 54 (FIG. 6B) include SC1, SC2, SC4, and SC8 having binary weights of 1, 2, 4, and 8 respectively. These switches 54 are manually settable switches having a range of $\phi$ through 15. Increasing the count on the switches by a binary 1 increases the starting point of the light responsive elements 28 to be selected as active by a factor of 4. Consequently, a binary count of 15 on the switches 54 provides an adjustment of 60 which adjustment relates to the 32 elements in bracket 38 (FIG. 3) and the 32 elements in bracket 40 (FIG. 3). The resistors R20 (FIG. 6A) are simply pull-up resistors which are associated with the switches 54 due to the floating inputs to the logical array 50. R22 is a pull-up resistor associated with the counters U10, U9, and U12. The resistors R20 and R22 are 1 Kohms. The actual adjustment procedure will be described later herein after a more detailed explanation of the scanner module 22.

Figure 6A:
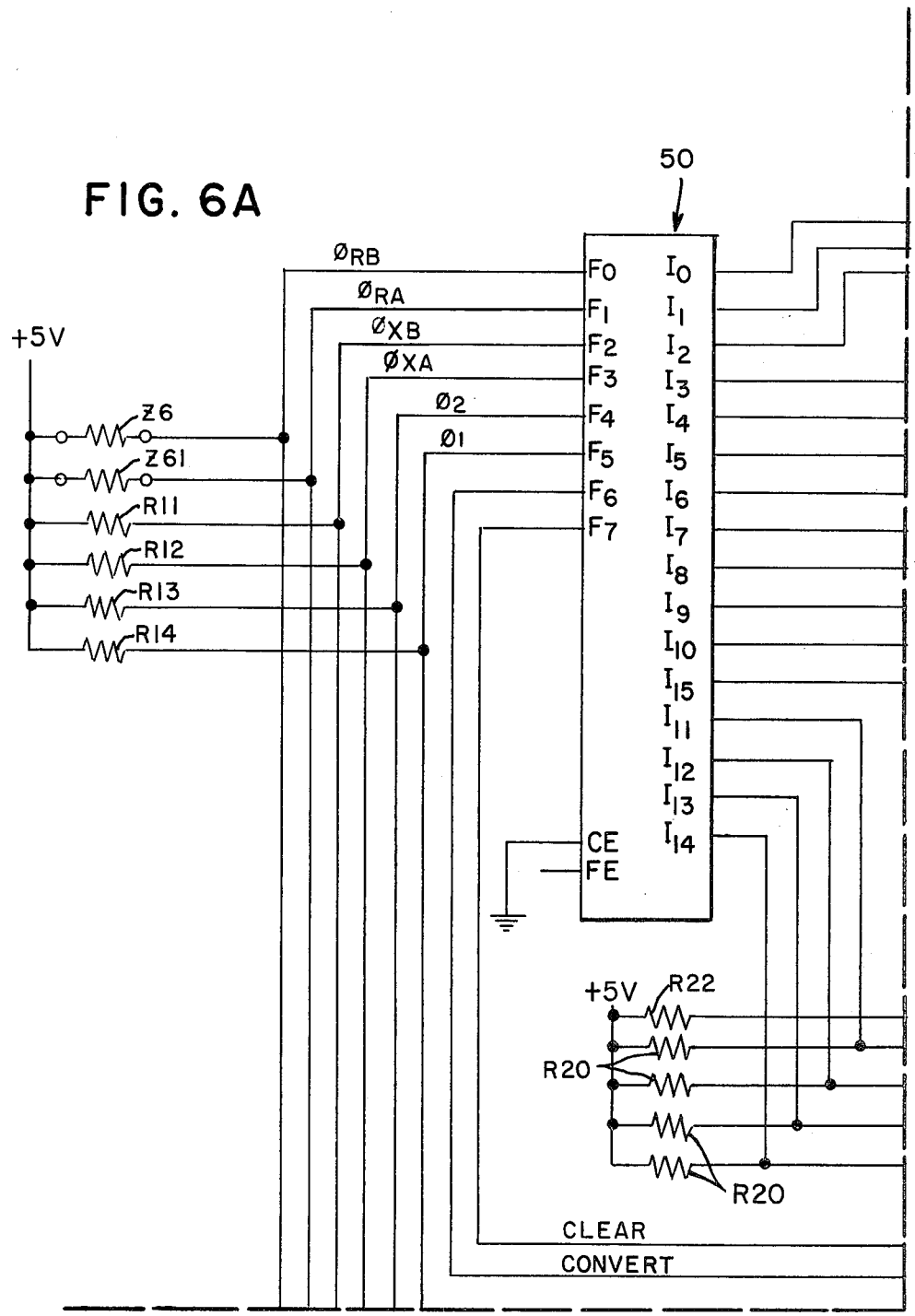

The logical array 50 in FIG. 6A has the pull-up resistors Z6, Z61, R11, R12, R13 and R14 connected to the F$_\phi$ through F5 outputs thereof as shown. The F$_\phi$ through F5 outputs provide the usual $\phi_{RB}$, $\phi_{RA}$, $\phi_{XB}$, $\phi_{XB}$, $\phi_{XA}$, $\phi_2$ and $\phi_1$ control inputs to the CCD 20; however, these outputs must be processed somewhat before being fed directly into the CCD 20.

In this regard, the $\phi_1$ and $\phi_2$ outputs from the logic array 50 are fed to the voltage level converters U5 and U51 (FIG. 6C), the $\phi_{XA}$ and $\phi_{XB}$ signals are fed to the voltage level converters U1 and U11, and the $\phi_{RA}$ and $\phi_{RB}$ signals are fed into the voltage level converters U4 and U41. The converters U5 and U51 comprise a conventional level converter chip (shown by the dashed line 58) such as #MMH0026 which is manufactured by Motorola, for example; the converters U1 and U11 similarly comprise a level converter chip 60, and the converters U4 and U41 similarly comprise a level converter chip 62. A conventional voltage regulator Q2 (FIG. 6C) utilizes a +15 volt input to provide an +8 volt output to each of the chips 58 and 60, and similarly, a conventional voltage regulator Q1 utilizes a +15 volt input to provide +12 volt output to the chip 62. The converters U5, U51, U1, U11, U4 and U41 shown in FIG. 6C comprise the level converter 56 shown in FIG. 5.

Figure 6C:
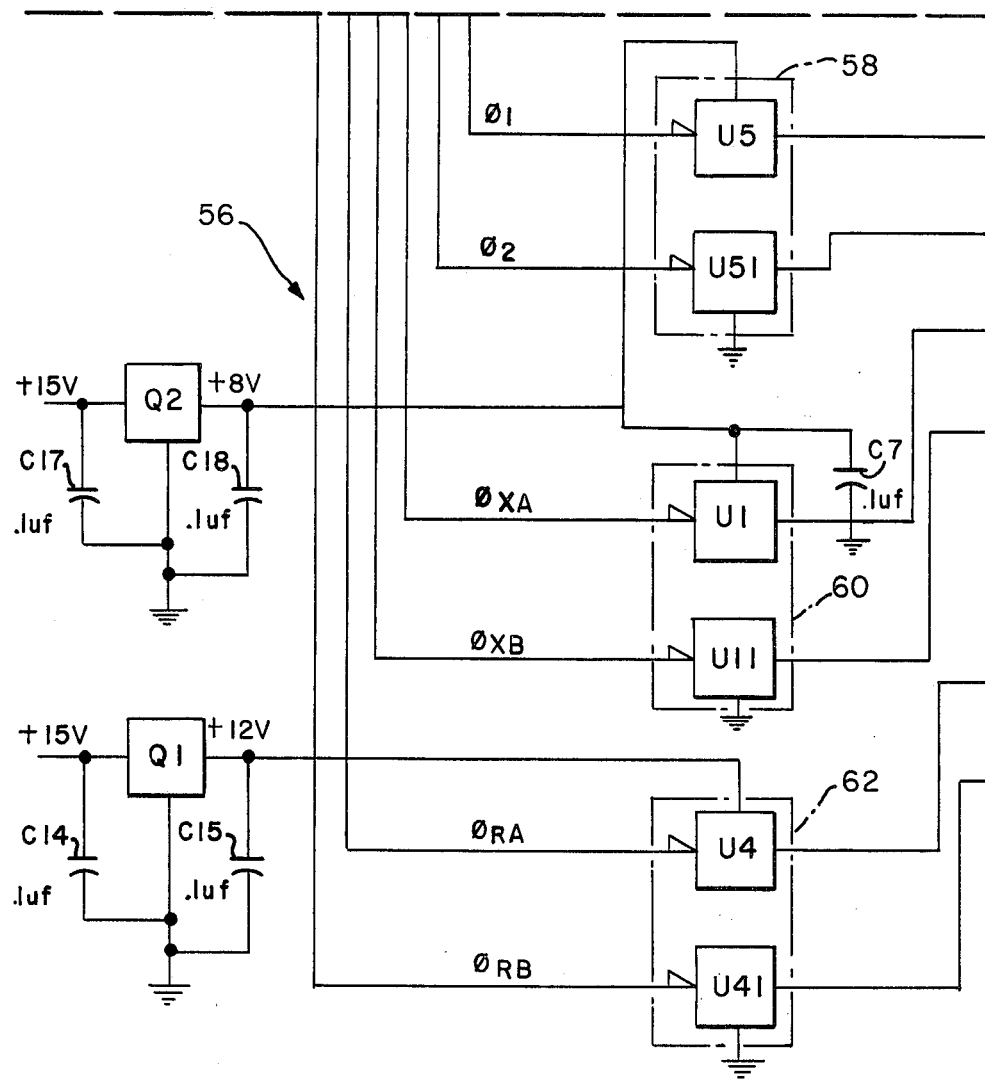
Figure 6E:
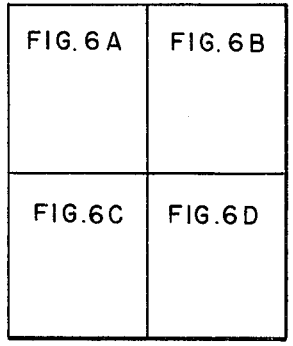
FIG. 6E shows how the FIGS. 6A-6D are to be arranged to form a composite drawing.
Figure 6D:
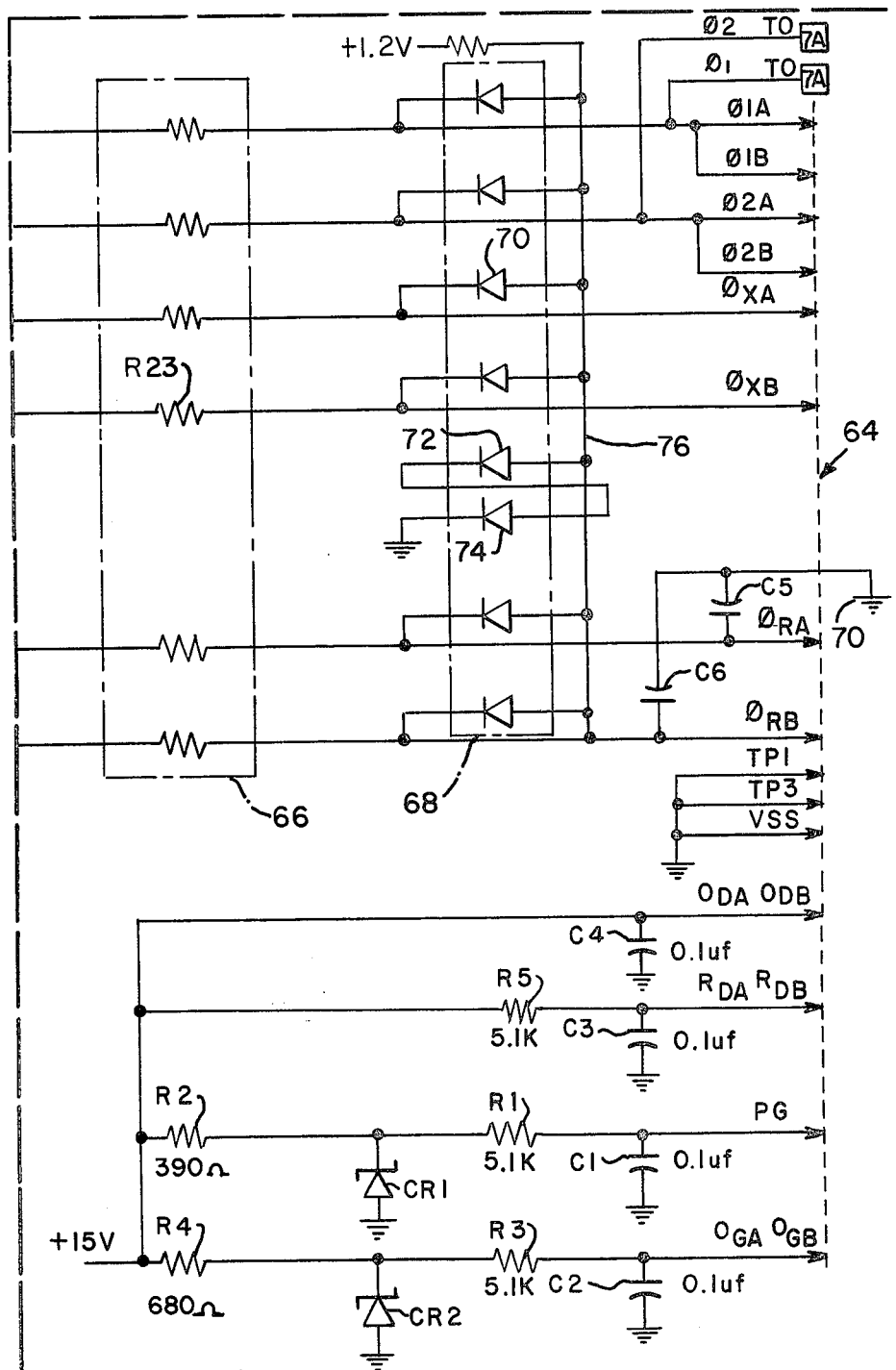

The $\phi_1$ signal from the converter U5 (FIG. 6C) becomes the $\phi_{1A}$ and $\phi_{1B}$ (FIG. 6D) inputs to the CCD 20. The various signals terminating in the dashed line 64 represent the various control signals which are connected to the corresponding terminals of the CCD 20, with the notations of these signals being those conventionally employed with the CCD 20. Similarly, the $\phi_2$ signal from the converter U51 becomes the $\phi_{2A}$ and $\phi_{2B}$ inputs to the CCD 20. The $\phi_{XA}$, $\phi_{XB}$, $\phi_{RA}$, and $\phi_{RB}$ coming from the converters U1, U11, U4, and U41, respectively in FIG. 6C are connected to the corresponding terminals of the CCD 20 and are shown in FIG. 6D next to the dashed line 64.

The function of the resistors within the dashed rectangle 66 (FIG. 6D) and the diodes within the dashed rectangle 68 is to prevent the outputs $\phi_{1A}$, $\phi_{1B}$, $\phi_{2A}$, $\phi_{2B}$, $\phi_{XA}$, $\phi_{XB}$, $\phi_{RA}$, and $\phi_{RB}$ from going below ground level which is shown at 70. For example, there is one resistor such as R23 in series with the output of the associated level converter U1 and the $\phi_{XA}$ terminal of the CCD 20, and a diode such as 70 having its cathode connected to one end of resistor R23 and its anode connected to a source of 1.2 volts potential. The diodes within the dashed rectangle 68 are all computer or fast operating type diodes such as type IN4150 which are manufactured by General Semiconductor, Inc., for example. The diodes 72 and 74 are series connected diodes and are used to prevent the point 76 from going below ground level, that is, point 76 is established at a voltage level of roughly 1.2 volts (or two "diode drops") above the reference ground 70. When the voltage level at the terminal $\phi_{XA}$ becomes less than 0.6 volts above reference ground 70, then the associated diode like 70 starts to conduct to pull up the voltage at the terminal.

The purpose of the resistors R1 through R5 (FIG. 6D), the capacitors C1 through C4, and the zener diodes CR1 and CR2 is to conventionally establish from the +15 volts input shown, all the conventional operating voltages for the $O_{DA}$, $O_{DB}$, $R_{DA}$, $R_{DB}$, PG, $O_{GA}$, $O_{GB}$ terminals of the CCD 20. The remaining inputs TP1, TP3, and VSS to the CCD 20 are ground connections.

Figure 7B:
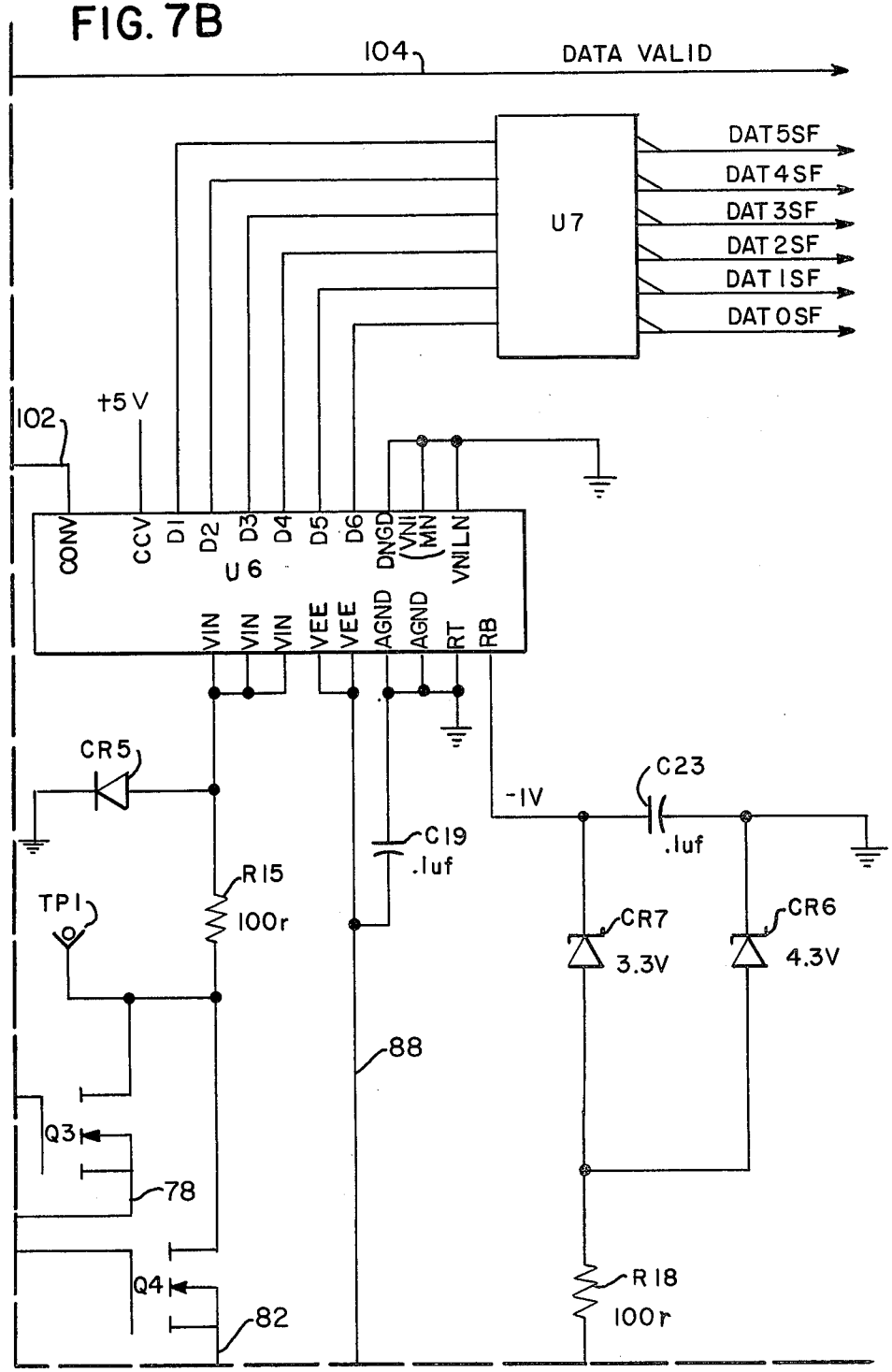
Figure 7C:
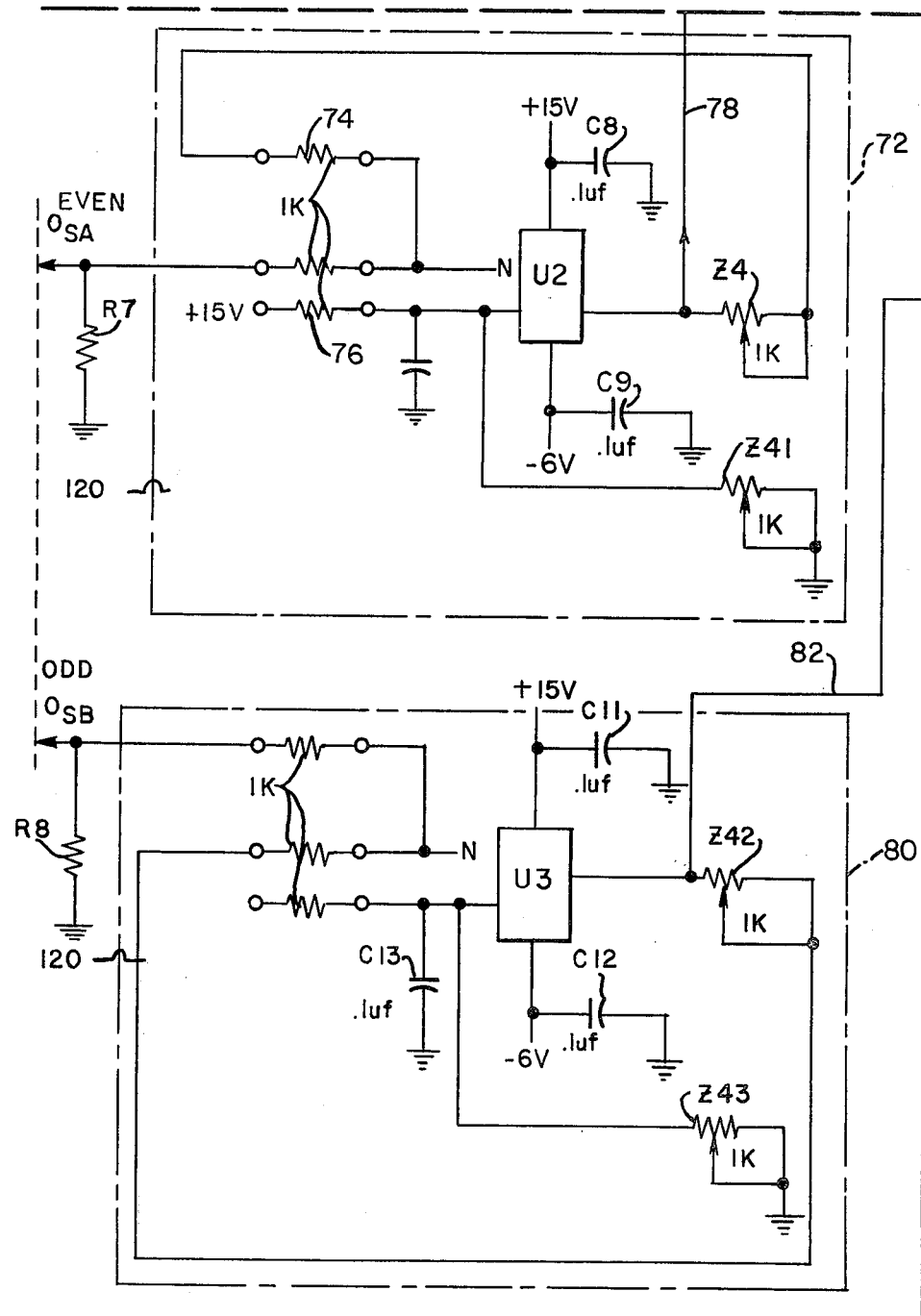

Earlier herein, it was stated that the two outputs from the CCD 20 are the $O_{SA}$ and $O_{SB}$ signals shown in FIG. 5; these same signals are also shown in FIG. 7C. Resistances R7 and R8 are connected between the $O_{SA}$ and $O_{SB}$ terminals and reference ground for connection cable impedance matching purposes.

The $O_{SA}$ output from the CCD 20 is fed into the conventional, non-inverting op amp U2 shown in more detail within the dashed rectangle 72 in FIG. 7C. All the resistors such as 74 shown within the rectangle 72 are 1 Kohms, and because the circuit within this rectangle is conventional, it need not be explained in any more detail. The output from the op amp U2 is obtained from the conductor 78 and is fed into the multiplexer Q3

(FIG. 7B). The resistor Z4 is a variable resistor which provides for an adjustable gain of the signal $O_{SA}$ in the op amp U2 of 1 to 2. The variable resistor Z41 and the resistor 76 provide an adjustment to a D.C. offset. In this regard, the signal $O_{SA}$ which is an analog signal, has a waveshape which is offset from $\phi$ volts by a certain voltage; the resistor 76 and the variable resistor Z41 eliminate this D.C. offset.

The $O_{SB}$ output from the CCD 20 is fed into the conventional, non-inverting op amp U3 (FIG. 7C) which is enclosed in the dashed rectangle 80. The op amp U3 is identical to op amp U2 and is used in the same manner as is op amp U2; correspondingly, the output from the op amp U3 is fed into the multiplexer Q4 (FIG. 7B) via the conductor 82.

According to the manner in which the CCD 20 is designed, it appears as though the output therefrom comes out on the $O_{SA}$ and $O_{SB}$ outputs mentioned in FIG. 7C, with each of these outputs being active for part of the time. For example, it can be considered that the $O_{SA}$ outputs from the CCD 20 relate to the even-numbered light responsive elements 28 and the $O_{SB}$ outputs relate to the odd-numbered elements 28; consequently, at any one time, the signal which will be utilized will come from either the $O_{SA}$ or the $O_{SB}$ outputs. Accordingly, the multiplexer Q3, Q4 (FIG. 7B) is used to switch the outputs from the op amps U2 and U3 to the A/D converter U6 shown in FIG. 7B.

The multiplexer Q3, Q4 (FIG. 7B) is a conventional multiplexer such as IC chip SD210 which is manufactured by Signetics, for example. When an analog signal ($O_{SA}$) for an even-numbered light responsive element 28 is present on conductor 78 from the op amp U2, a $\phi_1$ signal on the select line 84 (FIG. 7A) will cause the multiplexer Q3, Q4 to transfer the analog signal to the VIN input of the A/D converter U6. Correspondingly, when an analog signal ($O_{SB}$) for an odd-numbered, light-responsive element 28 is present on conductor 82 from the op amp U3, a $\phi_2$ signal on select line 86 (FIG. 7A) will cause the multiplexer Q3, Q4 to transfer the analog signal to the VIN input of the A/D converter U6 (FIG. 7B). The $\phi_2$ and $\phi_1$ signals on lines 86 and 84 in FIG. 7A are the same signals shown in FIG. 6D. The resistor R9 and the Zener diode CR3 and the resistor R10 and Zener diode CR4 (FIG. 7A) are utilized to provide a voltage level shift of 5 volts for the particular multiplexer Q3, Q4 selected, the resistors R9 and R10 each having one end connected to a source of $-15$ volts.

The A/D converter U6 (FIG. 7B) is a conventional converter such as IC chip #TDC1014J which is manufactured by T.R.W., Inc. The outputs from the op amps U2 and U3 coming over conductors 78 and 82, respectively, pass through a resistor R15 prior to entering the A/D converter U6. The purpose of the resistor R15 and a Schottky barrier diode CR5 (whose voltage drop is about 0.25 volt) is to prevent the voltage passing through the VIN input of the A/D converter U6 from going about 0.3 volt above system ground 70. The VEE input to the A.D. converter U6 is provided with a $-6$ volts input via conductor 88 from a conventional regulator circuit 90 enclosed in the dashed rectangle 92 (FIG. 7D). The function of the regulator circuit 90 (which includes a conventional regulator Q5) is to take a source of $-15$ volts shown and convert it to a very accurate $-6$ volts on its output conductor 88. The function of the conventional filtering circuit 94 enclosed in the dashed rectangle 96 in FIG. 7D is simply to provide filtering for the incoming $-15$, $+5$, and $+15$ voltages shown on the left side of the circuit 94 (as viewed in FIG. 7D) and provide the corresponding filtered outputs on the right side thereof. The various arrows such as 98, 100 (FIG. 7D) represent additional connectors to various parts of the scanner module 22 where required. The purpose of the resistor R18, the Zener diodes CR6 and CR7, and the capacitor C23 which are conventionally connected as shown in FIG. 7B is to take the $-6$ volts from conductor 88 and convert it to a $-1$ volt which is fed into the RB input of the A/D converter U6. The purpose of the capacitor C19 connected between the VEE and the A.GND. inputs of the A/D converter U6 is to filter the $-6$ volts on conductor 88.

The A/D converter U6 (FIG. 7B) has the usual convert signal coming over the conductor 102. When a convert signal is present, the A/D converter U6 will convert the analog signal present on its VIN input into a digital output on the D1 through D6 output terminals thereof. In the embodiment described, each analog signal ($O_{SA}$ and $O_{SB}$) is converted into a 6 bit binary output, as 64 different gray scale values (ranging from completely black to completely white) were required, although this number may be changed to suit particular applications. After a reset signal (FIG. 7A) to the scanner module 22, the first 6 bit output from the A/D converter U6 will be for pixel #$\phi$ (as previously described) coming over the even or $O_{SA}$ output of the CCD 20, and it will be followed by a second 6 bit output from the odd or $O_{SB}$ output of the CCD 20 (for pixel #1), etc.

Each six bit output from the A/D converter U6 (FIG. 7B) passes out in parallel to a conventional buffer U7 such as IC chip #74LS04 which is manufactured by Texas Instruments, Inc., for example. The six bit output for the associated pixel passes out in parallel from the buffer U7 upon the occurrence of a data valid signal on conductor 104, with one such signal being provided for each 6 bit pixel coming from the A/D converter U6 to provide the stream of 6 bit pixel values mentioned earlier herein.

The convert signal which is fed into the A/D converter U6 is derived from the F6 output of the logic array 50 (FIG. 6A), and this F6 output, which appears on conductor 102 in FIG. 7A, is also used for synchronizing purposes in the scanner module 22. The LOGIC "1" signal (FIG. 6B) is fed into the J input of a conventional flip flop U11 (FIG. 7A) while the F7 or CLEAR signal coming from the F7 output of the logic array 50 is fed into the clock input of the flip flop U11. The Q output of the flip flop U11 is fed into the J input of flip flop U111, and the CONVERT pulse from conductor 102 is fed into the clock input of flip flop U111. The Q output of flip flop U111 is fed into one input of a NAND gate U13 whose remaining input is connected to the CONVERT signal on conductor 102. When a reset signal occurs on conductor 106, the Q outputs of flip flops U11 and U111 will fall to a low level. When the reset signal is removed, the next CLEAR signal from the FPLA 50 (output F7) causes the Q output of flip flop U11 to rise to a high level. The first CONVERT signal on conductor 102 subsequently causes the Q output of flip flop U111 also to rise to a high level, thus enabling the NAND gate U13 to pass a signal therethrough whenever a CONVERT signal appears on conductor 102. The first CONVERT signal coming over conductor 102 causes a data valid signal on conductor 104 which indicates that the 6 bits of binary data for pixel

φ (in the embodiment described) appears in the buffer U7 (FIG. 7B); the second CONVERT signal causes a data valid signal on conductor 104 for pixel #1, etc. There is a total of 640 CONVERT signals from the F6 output of the logic array 50 for each scan (such as scan 26 in FIG. 2) of the check 12. It should also be mentioned that even during a reset signal, the counters U10, U9, and U12 continue to drive the logic array 50 so as to avoid damage thereto.

Having described the details of the scanner circuit 22, it is appropriate to now discuss the method of selecting the light responsive elements 28 (FIG. 3) which are to be actively used as the 640 selected elements 28.

As previously stated, the first step in the method of selecting the light responsive elements 28 is to mechanically focus the lens 32 so that it is centered as best as is possible at the exact center 36 (FIG. 3) of the light responsive elements 28. This is accomplished in the embodiment described by moving the CCD 20 relative to the optic axis of the lens 32.

After the array of light responsive elements 28 is mechanically centered with regard to the lens 32, a binary count of seven or eight is placed upon the switches 54 (FIG. 6B). In this regard, for a binary count of zero, all the switches 54 are closed, and for a binary count of 15, all the switches 54 are open. To apply a binary count of 1, switch SC1 is opened; and similarly, to apply a binary count of 8, only switch SC8 is opened. With a binary count of 8, for example, on the switches 54, the signals at test point 1 (TP1) in FIG. 7B and test point 2 (TP2) in FIG. 6B are examined. The signals at TP1 are the analog signals for the outputs of the light responsive members 28, and the signals at TP2 represent the CLEAR signals.

Figure 8:
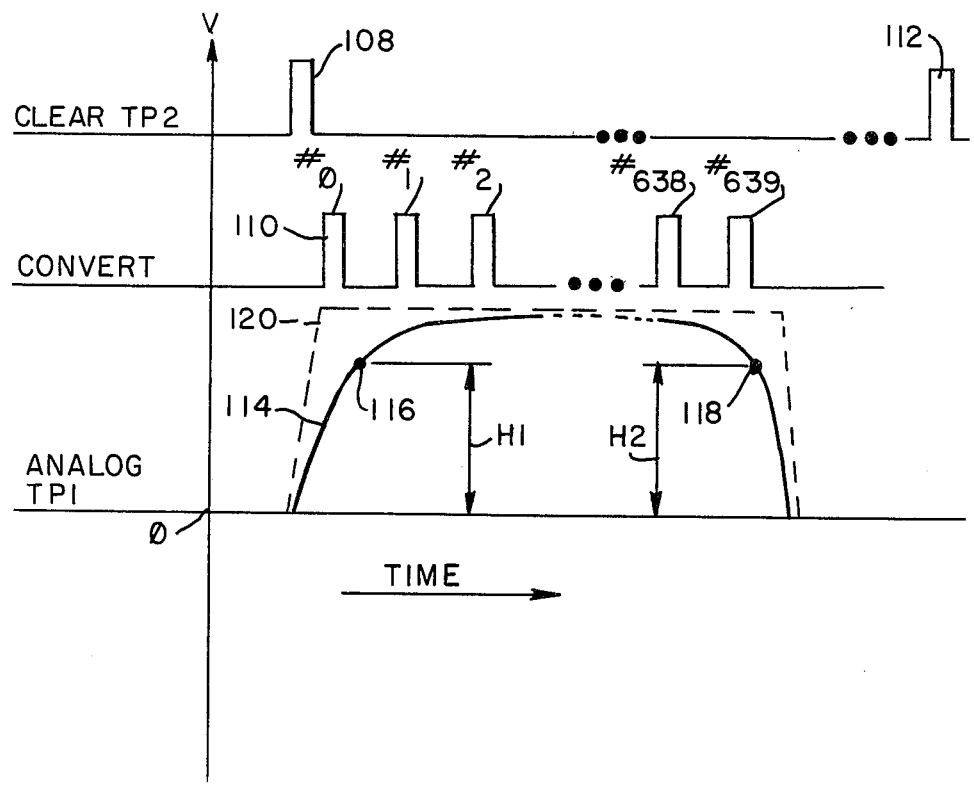
FIG. 8 is a timing chart showing certain wave patterns which are used in the method of this invention.

FIG. 8 shows the relationship among the CLEAR (TP2) CONVERT, and analog signals (TP1). In the embodiment described, the CLEAR signal 108 has a time duration which is one-fourth of the time for scanning a pixel. After a CLEAR signal 108, the first CONVERT signal 110, for pixel #φ occurs; the CONVERT signal has a time duration equal to that of the CLEAR signal. As seen in FIG. 8, a second CLEAR signal 112 occurs some time after the 640 CONVERT signals occur in normal operation due to only 640 light responsive elements 28 being used out of a total of 1,024 elements 28 as earlier described. The waveshape 114 represents a composite trace appearing on an oscilloscope resulting from the analog signals received from TP1 (FIG. 7B) being applied thereto. The point 116 represents the maximum value or the "top" of the analog signal at TP1 for pixel #φ, and similarly, point 118 represents the maximum value or the "top" of the analog signal for pixel #639 in the embodiment described. When the light responsive elements 28 which are selected are aligned with the lens 32 as previously explained, the point 116 (for pixel #φ) will have the same height (H1) as the height H2 (for pixel #639). Accordingly, the method of selecting the particular light responsive elements 28 which are aligned with the lens 32 is to vary the counts entered on the switches 54 (FIG. 6B) until the heights (voltages) H1 and H2 are the same for pixels #φ and #639. With a starting binary count of 8 on the switches 54, for example, if the points 116 and 118 are not of the same height, then a binary count of 7 or a binary count of 9 is tried to shift the waveshape 114 to the left or right as viewed in FIG. 8 to "shift the array of light responsive elements down or up" with regard to the center of lens 32. Changing from a binary count of 8 to a binary count of 7, for example, causes a shift of 4 light responsive elements 28 as previously described.

With a completely white background being detected by the light responsive elements 28 (FIG. 3), the elements 28 would produce a waveshape 120 shown in dashed outline in FIG. 8, with the waveshape rising very quickly to a peak and staying there until after pixel #639, whereupon the waveshape falls very quickly to a zero value. Due to limitations of the lens 32 (related to the cosine$^4$ law) the actual waveshape follows the waveshape 114 for a typical area being scanned.

I claim:

1. An imaging apparatus comprising:

an array having a central axis and also having a predetermined number of light responsive elements positioned in said array, with each said light responsive element producing an output in response to light impinging thereon;

an optical system including means for directing light from an image of a predetermined size onto a first number of said light responsive elements which said first number is less than said predetermined number;

first means including a programmable logic array for selecting a said first number of said light responsive elements which are positioned with regard to said central axis;

means for receiving said outputs of said selected first number of light responsive members and also for generating a stream of data therefrom; and second means for entering thereon different settings which cooperate with said first means for adjustably selecting out of said predetermined number the particular said first number of light responsive elements upon which light from said image impinges.

2. The apparatus as claimed in claim 1 in which said second means comprises switches.

3. An imaging apparatus comprising:

an array having a central axis and also having a predetermined number of light responsive elements positioned in said array, with each said light responsive element producing an output in response to light impinging thereon;

an optical system including means for directing light from an image of a predetermined size onto a first number of said light responsive elements which said first number is less than said predetermined number;

first means for selecting a said first number of said light responsive elements which are positioned with regard to said central axis;

means for receiving said outputs of said selected first number of light responsive members and also for generating a stream of data therefrom; and second means for entering thereon different settings which cooperate with said first means for adjustably selecting out of said predetermined number the particular said first number of light responsive elements upon which light from said image impinges;

said first means including a programmable logic array having logic equations therein for selecting said first number of light responsive elements, which said first number has a first light responsive element included therein for determining the start of said first number of light responsive elements in said array, and with a first output from said programmable logic array associated with said first light responsive element being used by said receiving and generating means for initiating said generating of said stream of data.

4. The apparatus as claimed in claim 3 in which said second means includes switches for entering said settings thereon for adjustably selecting the location of said first light responsive element of said first number within said array.

5. The apparatus as claimed in claim 4 in which said switches are manually-settable switches, and said light responsive elements included in said first number are contiguous.

6. The apparatus as claimed in claim 5 in which said outputs of said array comprise first and second outputs, and said receiving and generating means includes a multiplexer for alternately receiving said first and second outputs and also includes an analog to digital converter for converting said first and second outputs from said multiplexer into said stream of data.

7. The apparatus as claimed in claim 6 further comprising a buffer operatively connected to said analog to digital converter to receive said stream of data and to transfer said stream of data to a utilization device upon the occurrence of a data valid signal from said first means.

8. In an imaging apparatus having an array made up of a predetermined number of n plus m light-responsive elements wherein n is the number of said light responsive elements which will be aligned to receive incident light from an image of a predetermined size, and m is the number of light responsive elements in said array upon which no incident light is expected to fall, the method of selecting the particular ones of said light responsive elements which actually receive said incident light comprising the steps of:

(a) selecting a step size s, wherein s is less than said m but greater than zero and wherein said n may be selected from a plurality of different locations which plurality is equal to m divided by s locations;

(b) mechanically aligning an optical system to enable the incident light from said image to fall along an initial position in said array; and (c) selecting the particular n light responsive elements which actually receive said incident light by sequentially stepping a contiguous group of n light responsive elements in said step sizes s from said initial position along said array, if necessary, until the particular n light responsive elements selected correspond to those actually receiving said incident light from said image.

9. In an imaging apparatus having an array made up of a predetermined number of n plus m light-responsive elements wherein n is the number of said light responsive elements which will be aligned to receive incident light from an image of a predetermined size, and m is the number of light responsive elements in said array upon which no incident light is expected to fall, the method of selecting the particular ones of said light responsive elements which actually receive said incident light comprising the steps of:

(a) selecting a step size s, wherein s is less than said m but greater than zero and wherein said n may be selected from a plurality of different locations which plurality is equal to m divided by s locations;

(b) mechanically aligning an optical system to enable the incident light from said image to fall along an initial position in said array; and (c) selecting the particular n light responsive elements which actually receive said incident light by sequentially stepping a contiguous group of n light responsive elements in said step sizes s from said initial position along said array, if necessary, until the particular n light responsive elements selected correspond to those actually receiving said incident light from said image; and said selecting step being effected by comparing the output of a first light responsive element and a last light responsive element in said contiguous group and also by terminating said stepping step when the outputs from said first and last light responsive elements are equal.

* * * * *